United States Patent [19]
Shope et al.

[11] Patent Number: 5,261,046
[45] Date of Patent: Nov. 9, 1993

[54] RESEQUENCING LINE STORE DEVICE

[75] Inventors: Gary W. Shope; Jeffrey A. Small, both of Rochester, N.Y.

[73] Assignee: Eastman Kodak Company, Rochester, N.Y.

[21] Appl. No.: 774,141

[22] Filed: Oct. 15, 1991

Related U.S. Application Data

[63] Continuation of Ser. No. 290,666, Dec. 27, 1988, abandoned.

[51] Int. Cl.⁵ .......................... G06F 3/14; H04N 1/00
[52] U.S. Cl. ...................................... 395/162; 395/107
[58] Field of Search ............ 364/518, 521, 519, 143.6, 364/251.07; 340/747, 750, 789; 358/136, 474; 395/165, 106, 107, 164, 162

[56] References Cited

U.S. PATENT DOCUMENTS

| | | | |
|---|---|---|---|
| 3,634,828 | 1/1972 | Myers | 340/172.5 |
| 3,778,773 | 12/1973 | Hood | 340/166 R |
| 4,153,950 | 5/1979 | Nosowiscz | 365/231 |
| 4,525,729 | 6/1985 | Agulnek et al. | 346/154 |
| 4,590,585 | 5/1986 | Cummings et al. | 364/900 |
| 4,596,995 | 6/1986 | Yamakawa et al. | 346/160 |
| 4,609,927 | 9/1986 | Yoshida | 346/154 |
| 4,688,050 | 8/1987 | Tsao | 346/76 PH |
| 4,688,051 | 8/1987 | Kawakami et al. | 346/76 PH |
| 4,695,967 | 9/1987 | Kodama et al. | 364/521 |
| 4,704,616 | 11/1987 | Nakamura | 346/76 PH |
| 4,728,803 | 3/1988 | Catchpole et al. | 250/578 |
| 4,734,714 | 3/1988 | Takasu | 346/107 R |
| 4,746,941 | 5/1988 | Pham et al. | 364/519 |
| 4,760,387 | 7/1988 | Ishii et al. | 340/716 |
| 4,775,945 | 10/1988 | Cavill et al. | 364/519 |
| 4,799,149 | 1/1989 | Wolf | 364/200 |
| 4,882,686 | 11/1989 | Gretter | 364/518 |
| 4,910,505 | 3/1990 | Beaver et al. | 340/750 |
| 5,047,955 | 9/1991 | Shope et al. | 364/519 |

FOREIGN PATENT DOCUMENTS 0135880 3/1985 European Pat. Off. .

*Primary Examiner*—Phu K. Nguyen
*Attorney, Agent, or Firm*—Mark Z. Dudley

[57] ABSTRACT

An image recording apparatus with inexpensive data line resequencing circuitry for formatting image signals to a print head. The circuitry includes a resequencing line store device connectable to a data link and a control link for resequencing at least one first line of sequentially ordered data bits carried by the data link according to control signals carried by the control link. The resequencing line store device includes a plurality of interconnected memory cells operable for storage and selectable transfer of the data bits in response to the control signals, whereby the plurality of cells are arranged in a plurality of cell groups and a plurality of cell subgroups corresponding respectively to groups and subgroups of the bits. The bits may be shifted into the plurality of groups in sequential order and shifted from the plurality of cell subgroups in a non-sequential order corresponding to the first and second partitions.

15 Claims, 5 Drawing Sheets

RESEQUENCING LINE STORE DEVICE

This is a continuation of application Ser. No. 07/290,666 filed Dec. 27, 1988, now abandoned.

BACKGROUND OF THE INVENTION

1. Cross-Reference to Related Applications

Reference is made to copending, commonly assigned U.S. patent application Ser. No. 063,882, filed Jun. 19, 1987, now U.S. Pat. No. 5,047,955, in the names of Shope et al, and copending, commonly assigned U.S. patent application Ser. No. 064,739, filed Jun. 22, 1987, now U.S. Pat. No. 4,882,686 in the name of Gretter.

2. Field of the Invention

The present invention relates to non-impact printing apparatus for recording on a moving recording medium, and particularly to a resequencing line store device for resequencing sequential line data to be recorded on a recording medium.

3. Brief Description of the Prior Art

In the prior art as exemplified by U.S. patent application Ser. No. 064,739, "Printing Apparatus With Improved Data Formatting Circuitry", filed Jun. 22, 1987, now U.S. Pat. No. 4,882,686, printing apparatus is described which comprises a multiplicity of individually addressable and energizable point-like radiation sources, such as light-emitting diodes (LED's), arranged in row(s) for exposing points upon a photoreceptor during movement thereof relative to and in a direction normal to the row(s). Driver circuits are provided for simultaneously energizing the radiation sources responsive to respective data bit input signals applied to the driver circuits during an information line period. The print or recording head includes a support upon which are mounted chips placed end to end and upon each of which are located a group of LED's. The driver circuits are incorporated in other chips located to each side of the linear array of LED's. The driver chips are provided to both sides of the LED array and the drive circuitry is alternately interleaved. The linear array with respective driver circuits thereby collectively forms a LED bar. The print or recording head is typically a multi-channel device; e.g., the data is supplied to the several driver circuits in the print head on multiple data lines or channels. The number of such channels is typically two or four, and sometimes higher numbers depending upon the print head configuration.

The driver circuits in this apparatus each include a shift register for serially receiving data-bit signals and for driving respective LED's in accordance with the data or image signals. The shift registers on adjacent chips are coupled together to function as a single "shift register assemblage" so that the data bits (image signals) flow serially into the shift registers in the shift register assemblage under clock control. Because of the extremely small separation distance between the individual LED's, the conductive lines to each LED are arranged at the periphery of the LED group in an odd-even pattern. At one side of a LED bar is arranged the conductive lines or foils which lead to the shift registers for the even-numbered LED's, and at the opposing side are the lines similarly arranged to the registers for the odd-numbered LED's. Moreover, the total number of registers in each side is divided into a high set and a low set of registers and thus two correspondingly-named data lines or channels supply each side. Hence, data must be provided to the high and low shift registers located to one side of the LED's, as appropriate for the odd-numbered LED's, and similarly to the shift registers on the other side. This arrangement speeds the flow of data to the shift registers in that the odd and even data bits go simultaneously to respective odd and even shift register assemblages. While data is being shifted down one set of odd shift registers, additional odd bits of data simultaneously are being shifted down other odd shift register assemblages.

However, in such an apparatus, the image signals are resequenced by reading them from a buffer memory means to an intermediate register means. Thus, the data must be first stored in the memory means in sequential order and then extracted from the memory means so as to be placed in the intermediate register means. The data is then extracted by selectively addressing the memory means, and the resequencing requires a particular addressing scheme to properly address the necessary data bits retained in the memory means.

The data management for this type of apparatus may be complex or simple depending upon the arrangement of the data. Generally in applications having data outputted by a raster image processor (RIP) intended to be written by a laser beam, data management for directing such data to a multiple array print head presents some difficulties. This is due to the sequential order in which the data is provided, particularly in applications having a printer control system operated from a RIP as is described in copending, commonly assigned U.S. patent application Ser. No. 063,882, filed Jun. 19, 1987, now U.S. Pat. No. 5,047,955 in the names of Shope et al. In a laser exposure device that employs, for example, a rotating polygon to expose a line in the mainscanning direction, the data is sequenced first pixel first, and so on until the last pixel on the line. The data stream may be reformatted into multi-bit parallel words for retention in various frame or page data buffers.

It has been found, therefore, that a need exists for resequencing circuitry for converting an image data stream of sequential order into multiple data streams suitably organized for use by print head or other devices which receive data in multiple data streams partitioned in a high-and-low, odd-and-even numbered data bit format.

SUMMARY OF THE INVENTION

The apparatus of the present invention is preferred for use in an electrostatographic reproduction apparatus wherein rasterized image signals are fed to a resequencing circuit for resequencing the image data on a line-by-line basis. The resequenced data line is subsequently transferred to a recording means, such as a print head, wherein a plurality of recording elements are arranged in a line configuration. Intermediate register means outputs the image signals in parallel to each of several shift register assemblages. Driving means actuate the elements for recording on a line-by-line basis.

In accordance with the invention, the apparatus comprises a resequencing line store device connectable to a data link and a control link for resequencing at least one line of sequentially ordered data bits carried by the data link according to control signals carried by the control link. The resequencing line store device includes a plurality of interconnected memory cells operable for storage and selectable transfer of the data bits in response to the control signals, in that the plurality of cells are arranged in a plurality of cell groups and a plurality of cell subgroups corresponding respectively to first and second partitions of the bits. The bits may be shifted into the plurality of groups in sequential order and shifted from the plurality of cell subgroups in a non-sequential order corresponding to the first and second partitions.

In another embodiment of the present invention there is provided an apparatus for resequencing rasterized data bits to be furnished to a print head having a plurality of recording elements. The apparatus comprises a source of rasterized data bits provided in a given sequence and a matrix of M×N memory cell means operable for storage and selectable transfer of the data bits in response to control signals. The matrix of cells is arranged so as to form M rows of shift registers of N column stages each, wherein M and N are both integers greater than one. Control means provides control signals for parallel shifting of M-bit words of data along the column stages of the register to fill the matrix of memory cells with M×N bits of data. Additional control signals are provided for serially shifting data bits from an Nth column stage of the matrix and from an intermediate column stage to the print head to thereby resequence the data provided.

In still another embodiment of the present invention there is provided a data resequencing apparatus for resequencing at least one line of sequentially-ordered data bits which comprises at least one resequencing line store device having a plurality of interconnected memory cells operable for storage and selectable transfer of the data bits, wherein each of the cells are adapted for storage of one of the bits and the plurality of cells are arranged in a plurality of cell groups and a plurality of cell subgroups corresponding respectively to first and second partitions of the data bits. There is also provided control means for providing control signals to implement the selectable transfer of the sequential data into the resequencing line store device and out of the plurality of cell subgroups, control signal link means connected between the control means and the resequencing line store device for carrying the control signals, and data link means connected to the resequencing line store device for carrying the data bits. The sequentially-ordered line of data may be thereby loaded into the resequencing line store device in the sequential order and unloaded from the plurality of cell subgroups in a resequenced order corresponding to the first and second partitions.

In still another embodiment of the present invention, there is provided an electrostatographic image recording apparatus which comprises memory means that includes at least one resequencing line store device. The resequencing line store device includes at least a plural predetermined number of memory sites for storing therein a full line of sequential image data to be transferred therefrom in resequenced order for recording by the apparatus. The recording means includes a plurality of recording elements, and driver means for activating same, for recording an image on a recording material on a line by line basis; shift register assemblage means which has a plural predetermined number of shift register assemblages, each of which store image signals that are serially inputted therein and which output the image signals in parallel to the driver means; and writer interface means operable for controlling a first transfer of the data line to the memory means and a second transfer of said data line in resequenced fashion to the shift register assemblage means.

DESCRIPTION OF THE PREFERRED EMBODIMENTS

The apparatus of the preferred embodiment will be described in accordance with an electrostatographic recording medium. The invention, however, is not limited to apparatus for creating images on such a medium, as other media such as photographic film etc. may also be used within the spirit of the invention.

Because electrostatographic reproduction apparatus are well known, the present description will be directed in particular to elements forming part of or cooperating more directly with the present invention. Apparatus not specifically shown or described herein are selectable from those known in the prior art.

Figure 1:
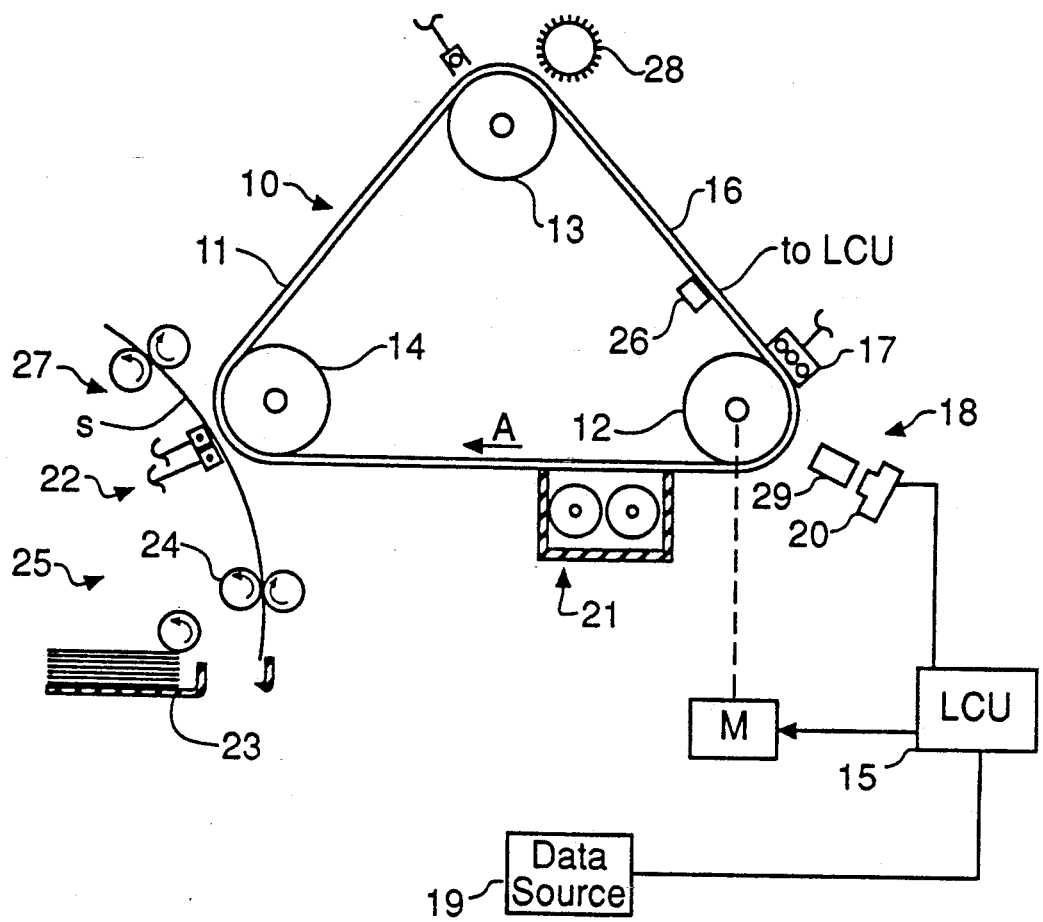
FIG. 1 is a schematic of a printing apparatus of the prior art.

With reference now to FIG. 1, an electrostatographic reproduction apparatus 10 includes a recording medium such as a photoconductive web 11 or other photosensitive medium that is trained about three transport rollers 12, 13 and 14, thereby forming an endless or continuous web. Roller 12 is coupled to a driver motor M in a conventional manner. Motor M is connected to a source of potential when a switch (not shown) is closed by a signal from a logic and control unit (LCU) 15. When the switch is closed, the roller 12 is driven by the motor M and moves the web 11 in clockwise direction as indicated by arrow A. This movement causes successive image areas of web 11 to sequentially pass a series of electrophotographic work stations of the reproduction apparatus.

For the purposes of the instant disclosure, several work stations are shown along the web's path. These stations will be briefly described.

First, a charging station 17 is provided at which the photoconductive surface 16 of the web 11 is sensitized by applying to such surface a uniform electrostatic primary charge of a predetermined voltage. The output of the charger may be controlled by a grid connected to a programmable power supply (not shown). The supply is in turn controlled by the LCU 15 to adjust the voltage level Vo applied onto the surface 16 by the charger 17.

At an exposure station 18 an electrostatic image is formed by modulating the primary charge on an image area of the surface 16 with selective energization of point-like radiation sources in accordance with signals provided by an image data source 19 such as a document image scanner, computer work station, word processor, and the like which generally produce print jobs as character code signals, such as ASCII code. The print jobs are sometimes queued in a print server, and spooled one page at a time to a raster image processor (RIP). The point-like radiation sources are supported in a print head 20 to be described in more detail below.

A development station 21 includes developer which may consist of iron carrier particles and electroscopic toner particles with an electrostatic charge opposite to that of the latent electrostatic image. Developer is brushed over the photoconductive surface 16 of the web 11 and toner particles adhere to the latent electrostatic image to form a visible toner particle, transferable image. The development station may be of the magnetic brush type with one or two rollers. Alternatively, the toner particles may have a charge of the same polarity as that of the latent electrostatic image and develop the image in accordance with known reversal development techniques.

The apparatus 10 also includes a transfer station 25 shown with a corona charger 22 at which the toner image on web 11 is transferred to a copy sheet S; and a cleaning station 28, at which the photoconductive surface 16 of the web 11 is cleaned of any residual toner particles remaining after the toner images have been transferred. After the transfer of the unfixed toner images to a copy sheet S, such sheet is transported to a heated pressure roller fuser 27 where the image is fixed to the copy sheet S.

As shown in FIG. 1, a copy sheet S is fed from a supply 23 to driver rollers 24, which then urge the sheet to move forward onto the web 11 in alignment with a toner image at the transfer station 25.

To coordinate operation of the various work stations 17, 18, 21, and 25 with movement of the image areas on the web 11 past these stations, the web has a plurality of indicia such as perforations along one of its edges. These perforations generally are spaced equidistantly along the edge of the web 11. At a fixed location along the path of web movement, there is provided suitable means 26 for sensing web perforations. This sensing produces input signals into the workstation LCU 15 which has a digital computer, preferably a microprocessor. The microprocessor has a stored program responsive to the input signals for sequentially actuating, then de-actuating the work stations as well as for controlling the operation of many other machine functions. Additional or other encoding means may be provided as known in the art for providing the precise timing signals for control of the various functions of the apparatus 10.

Programming of a number of commercially available microprocessors is a conventional skill well understood in the art. This disclosure is written to enable a programmer having ordinary skill in the art to produce an appropriate control program for the one or more microprocessors used in this apparatus. The particular details of any such program would, of course, depend on the architecture of the designated microprocessor.

Figure 2:
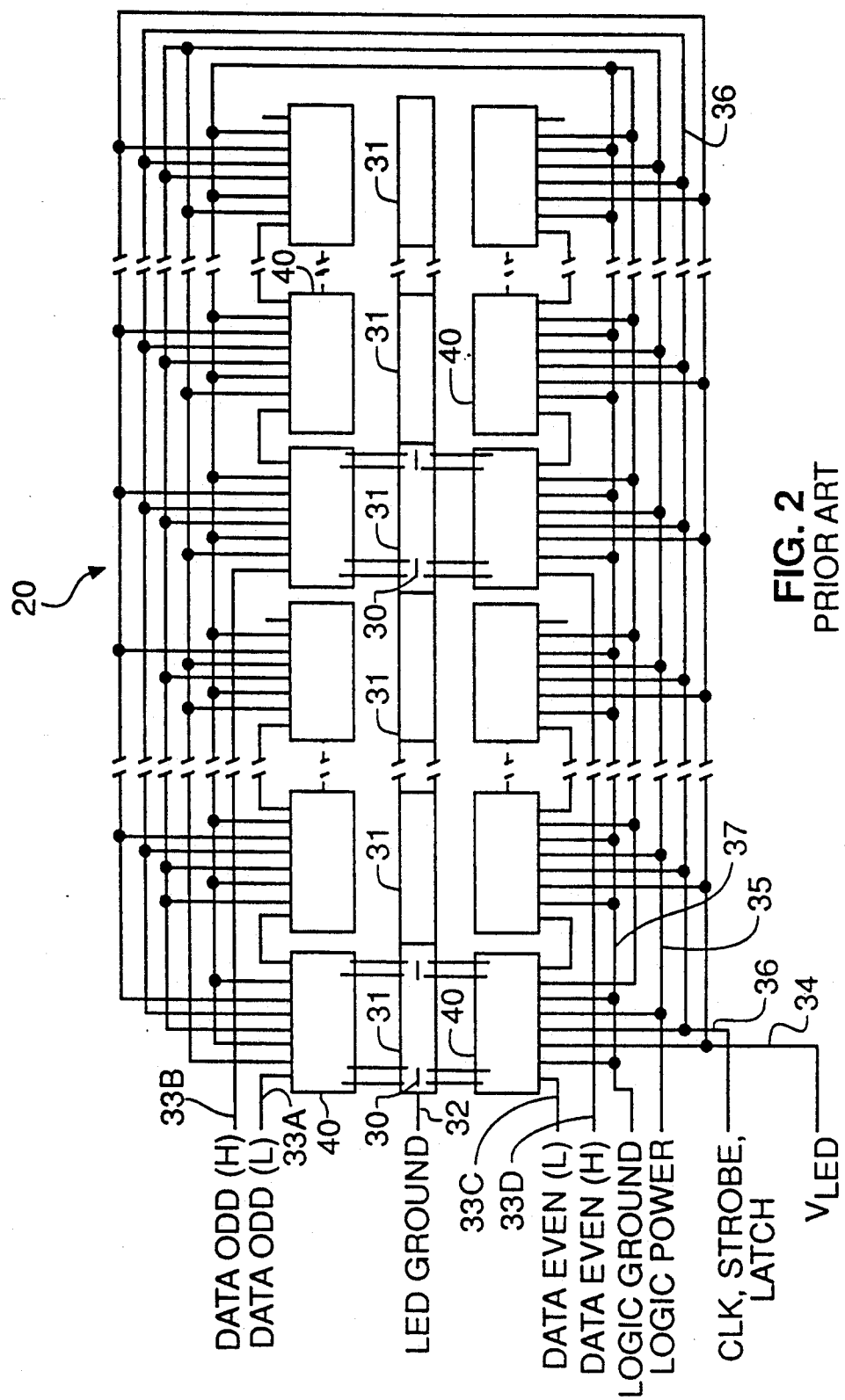
FIG. 2 is a block diagram of circuitry used in forming a print head of the apparatus of FIG. 1 in accordance with the prior art.

With reference to FIGS. 1 and 2, the print head 20, as noted, is provided with a multiplicity of energizable point-like radiation sources 30, preferably light-emitting diodes (LED's) although other recording devices such as thermal devices, liquid crystal display elements or needle electrodes are also contemplated. Optical means 29 may be provided for focusing light from each of the LED's onto the photoconductive surface. The optical means preferably comprises an array of optical fibers such as sold under the name SELFOC, a trademark for a gradient index lens array sold by Nippon Sheet Glass, Limited. Due to the focusing power of the optical means 29, a row of emitters will be imaged on a respective transverse line on the recording medium.

With reference to FIG. 2, the print head 20 comprises a suitable support with a series of LED chips 31 mounted thereon. Each of the chips 31 includes in this example 64 LED's arranged in a single row. Chips 31 are also arranged end-to-end in a row and where seventy-six LED chips are so arranged, the print head will extend across the width of the web 11 and include 4864 LED's arranged in a single row. To each side of this row of LED's there are provided seventy-six identical driver chips 40. Each of these driver chips include circuitry for addressing the logic associated with each of 32 LED's to control whether or not an LED should be energized or activated. Two driver chips 40 are thus associated with each chip of 64 LED's. Each of the two driver chips will be coupled for driving of alternate LED's. Thus, one driver chip will drive the odd numbered LED's of the 64 LED's and the other will drive the even numbered LED's of these 64 LED's. The driver chips 40 are electrically connected in parallel to a plurality of lines 34-37 providing various electrical control signals and potentials. Lines 34 and 35 provide electrical energy for operating the various logic devices and current drivers in accordance with their voltage requirements. Lines 32 and 37 provide ground or return lines for lines 34 and 35, respectively. A series of lines, 36a, b and c provide clock signals and other pulses for controlling the movement of data to the LED's in accordance with known techniques. Data lines 33A, 33B, 33C and 33D are also provided for providing digital data or image signals in the form of either a high or low logic level. The driver chips each include a data-in and data-out port so that data is serially passed between appropriate chips. Driver chips having respective shift registers linked together as such comprise a "shift register assemblage."

The driver chips receiving the data for the odd numbered LED's are divided into two shift register assemblage groups. The first group of shift register assemblages receive data serially through line 33A. The second group of driver chips receive data through line 33B. Similarly, the driver chips receiving the data for the even-numbered LED's are divided into two shift register assemblage groups and receive data over lines 33C, 33D, respectively.

Figure 3:
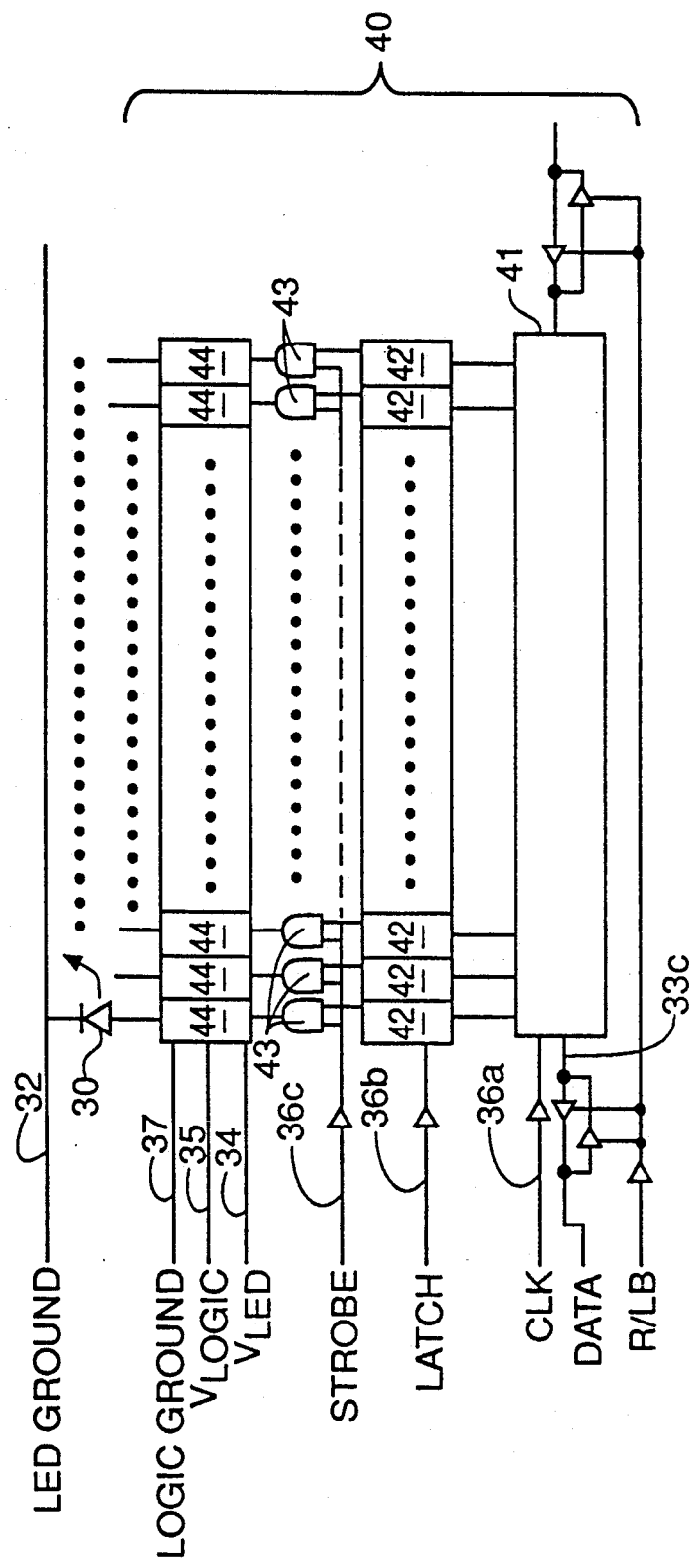
FIG. 3 is a block diagram of a prior art driver circuit for use in the print head of FIG. 2.

With reference now to FIG. 3, the architecture for each driver chip 40 includes a 32 bit bi-directional shift register 41. A logic signal carried over line R/LB determines the direction data will flow down this register. Assume that this chip is enabled to cause data to flow down the register from left to right as shown in FIG. 3. Data thus enters shift register 41 over line 33C through the driver chip's data-in port at the left from, for example, the data-out port of a driver chip immediately to the left or from the LCU if the driver chip 40 is the first chip for data to enter. Data exits from this chip at the data-out port to be input to the next adjacent driver chip to the right of driver chip 40. In operation, for each line of image to be exposed in the main scanning direction, i.e., transverse to that of movement of the recording medium 11, suitably rasterized data from the data source streams serially through each of the four shift register assemblages under control of clock pulses provided by the LCU over line 36a. When 4864 bits of data (1's or 0's) are stored by the shift registers of all of the driver chips, a latch signal is provided over line 36b to latch this data into latch registers 42 so that the shift registers 41 may commence filling with data signals for the next line of exposure. Thirty-two latch registers 42 are provided in each driver chip to receive the data transferred in parallel fashion from the shift register 41.

Each latch register is associated with a particular LED and adjacent latch registers are associated with every other LED. A logic AND gate 43 is associated with each latch register and has one input coupled to the output of its respective latch register and its other input coupled to a line 36c for providing a strobe or timing pulse from the LCU. This strobe pulse determines when to trigger the LED's to turn on in relation to the position of the recording medium and the duration for which the LED's are turned on. All the AND gates have one of their inputs connected to this strobe line. The output of each of the AND gates is coupled to a logic circuit that is part of a constant current driver circuit 44. Leads to the constant current driver circuit include voltage supply and ground lines (35 and 37, respectively) to the logic devices therein as well as separate voltage and return lines (34 and 32, respectively) for providing current to the LED's. Alternatively, several strobe signals of varying durations may be used to control the "on" times of the LED's in accordance with time durations designed to provide uniform light output on the average for the subgroups of LED's on each chip.

Figure 4:
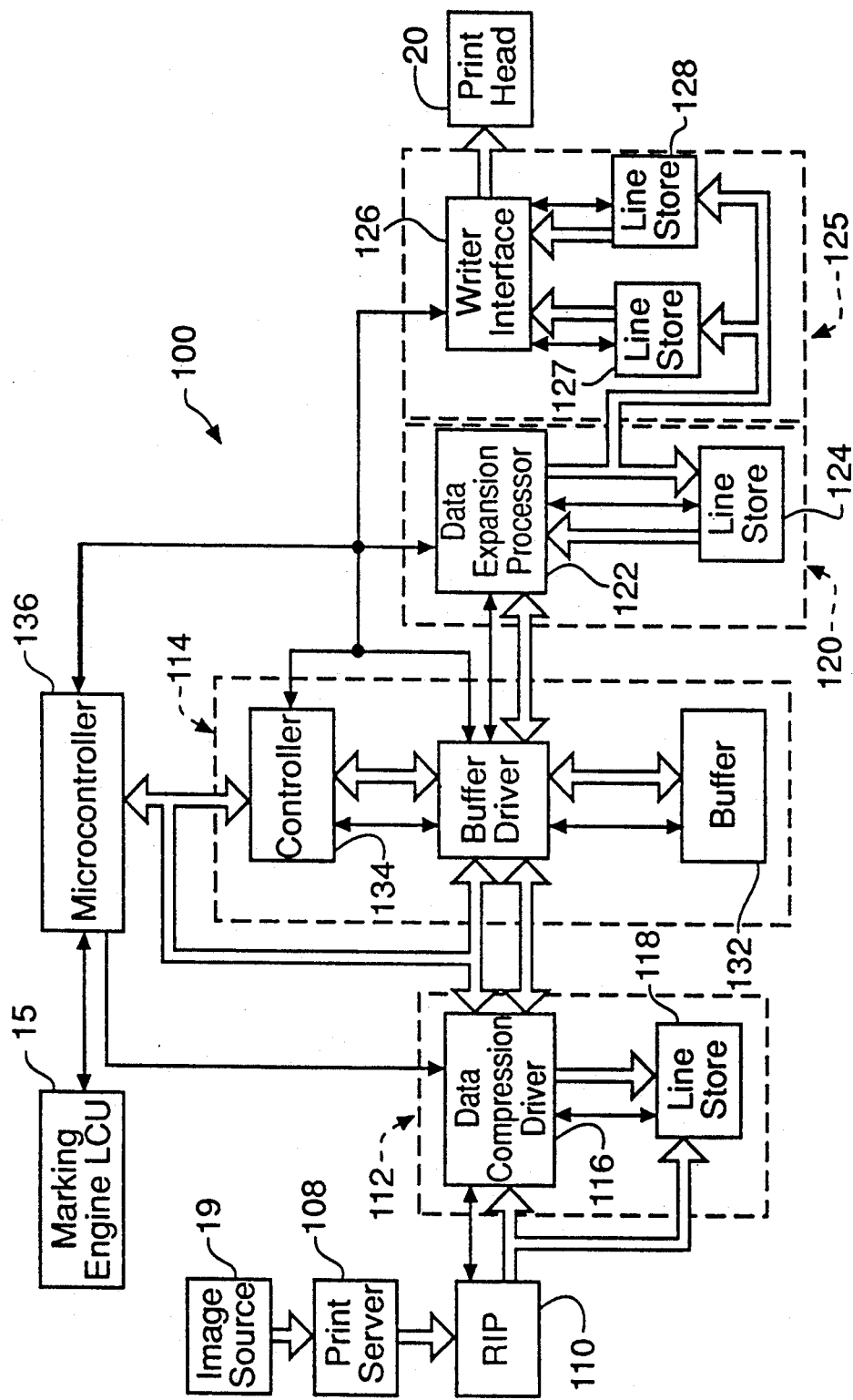
FIG. 4 is a block diagram of a printer control system which includes an improved data resequencing circuit for formatting data to the driver circuit of the print head of FIG. 2 in accordance with the invention.

With reference now to FIG. 4, a printer control system or job image buffer (JIB) 100 is shown. The JIB 100 is operable in conjunction with or disposed within the LCU 15 of the reproduction apparatus 10 as described previously with respect to FIG. 1. The JIB 100 is therefore interconnected with the image source 19 and the print head 20. General motor control and control of other workstation functions as previously described with respect to the LCU 15 are thus unchanged. However, it is to be understood that the following is applicable generally to any electronic printing apparatus wherein an image to be printed is received from a data or image source as character code signals for rasterization in a raster image processor.

In FIG. 4, elements comprising the JIB 100 are interconnected by a series of data links shown as double-line arrows and control links shown as single-line arrows. Image data source 19 produces print jobs as character code signals to be queued in a print server 108, and spooled one page at a time to a raster image processor (RIP) 110. The RIP converts the character code signals to a rasterized video data stream for printing pixel by pixel as described hereinabove.

The JIB 100 receives the image data stream from the RIP 110. The JIB includes a data compressor 112, which is preferably a hardware implementation of an appropriate algorithm which encodes redundant information into a more compact form before passing the compressed data stream to a multi-page image buffer 114, also part of the JIB. A preferred compression algorithm is the CCITT Group IV facsimile algorithm, which is well known to those skilled in the art, but other forms of data compression are available, and reference is made to *Data Compression* by Gilber Held, 1983, John Wiley and Sons, for examples of various compression techniques. Data compressor 112 includes a data stream compression driver 116 and a line store 118 for buffering a full line's worth of data.

An expander 120 is the companion to data compressor 112, and it includes a data expansion processor 122 and a line store 124. The expander retrieves the compressed data stream from multi-page image buffer 114 and reconstructs the output data into original form. The data stream is transmitted to a data resequencing circuit 125 as sixteen-bit data words on a parallel data link. The resequencing circuit 125 is comprised of two resequencing line store devices 127 and 128 constructed according to the present invention and a writer interface 126, and is also part of the JIB.

Multi-page image buffer 114 is provided for storing image data to permit the electronic recirculation of images for collation; thereby eliminating the need for a mechanical recirculating document handler. The heart of the JIB is a large bank of dynamic random access memory (DRAM) in a buffer 132 for storage of the image data as it is processed by data compressor 112.

Controller 134 acts as a direct memory access controller, allowing data compressor 112 and expander 120 direct access to DRAM buffer 132 without a microprocessor, and as a DRAM controller arbitrating between memory read, write, and refresh cycles.

A microcontroller 136 functions as the system manager, overseeing the overall operation of the JIB. The microcontroller will handle communication with the logic and control unit (LCU) 15 of the marking engine, store the internal pointers identifying the beginning and ending addresses for each image, initiate transfers from the RIP 110, and control the data compression and expansion process.

The writer interface 126 receives a full line of image data from the expander 120 after the line is processed by one of the pair of resequencing line stores 127 and 128. The resequencing line stores 127 and 128 are duplicate devices, each of which are constructed according to the present invention as a novel resequencing line store device operable for the resequencing of data. The paired resequencing line stores 127 and 128 are operated to resequence the data stream before sending it to the driver chips 40 on the print head 20.

Description for operation of one of the two duplicate resequencing line stores 127 and 128 and a method of resequencing one line of data will now be made. It should be understood that the second of the two duplicate devices is also provided for operating upon a second line of data. Thus, in any two lines of data wherein the first line is presented by the expander 120 before the second line, the second line of data is being resequenced by one of the two resequencing line store devices 127 and 128 while the first line of data, already resequenced, is being sent to the shift register assemblages on print head 20 by the other resequencing line store. Accordingly, when a third line of data is then presented to the latter line store, the former line store is then delivering the resequenced second line to the shift register assemblages on the print head 20. By alternating the resequencing of the bits, data is thereby transferred to the print head at the same high data rate that is output from the RIP, even though the data is being continuously operated upon by the resequencing circuit 125.

As was described hereinabove, in the preferred embodiment of the present invention, there are 4864 bits of data or image signals to be resequenced for each line of rasterized image data. Data is generated by the data source 19 and provided as a bit stream of rasterized data by RIP 110. The RIP delivers the data bits for each line of print in sequential order such that the first bit represents the first numbered pixel at the beginning of a line in the main scanning direction and the last bit represents data for the 4864th numbered pixel at the end of the line. The data stream is transmitted from the expander 120 to a data resequencing circuit 125 as sixteen-bit data words on a parallel data link. However, the 4864 bits of image data per data line must exit the JIB 100 in groups of odd/low, odd/high, even/low, even/high ordered bits to the corresponding four data input channels 33A, 33B, 33C, and 33D of the shift register assemblages on the print head 20. This requirement is due to the aforementioned use of odd and even driver chips and of grouping both the odd and even driver chips further into low and high numbered LED driver chips. By dividing the distribution of the bits into four channels to the proper shift registers on the print head, data is thereby transferred to the print head 20 at the same high data rate that is output from the RIP, even though the shift registers on the print head have a shifting speed of only one fourth of the data clock speed of the RIP 110.

Figure 5:
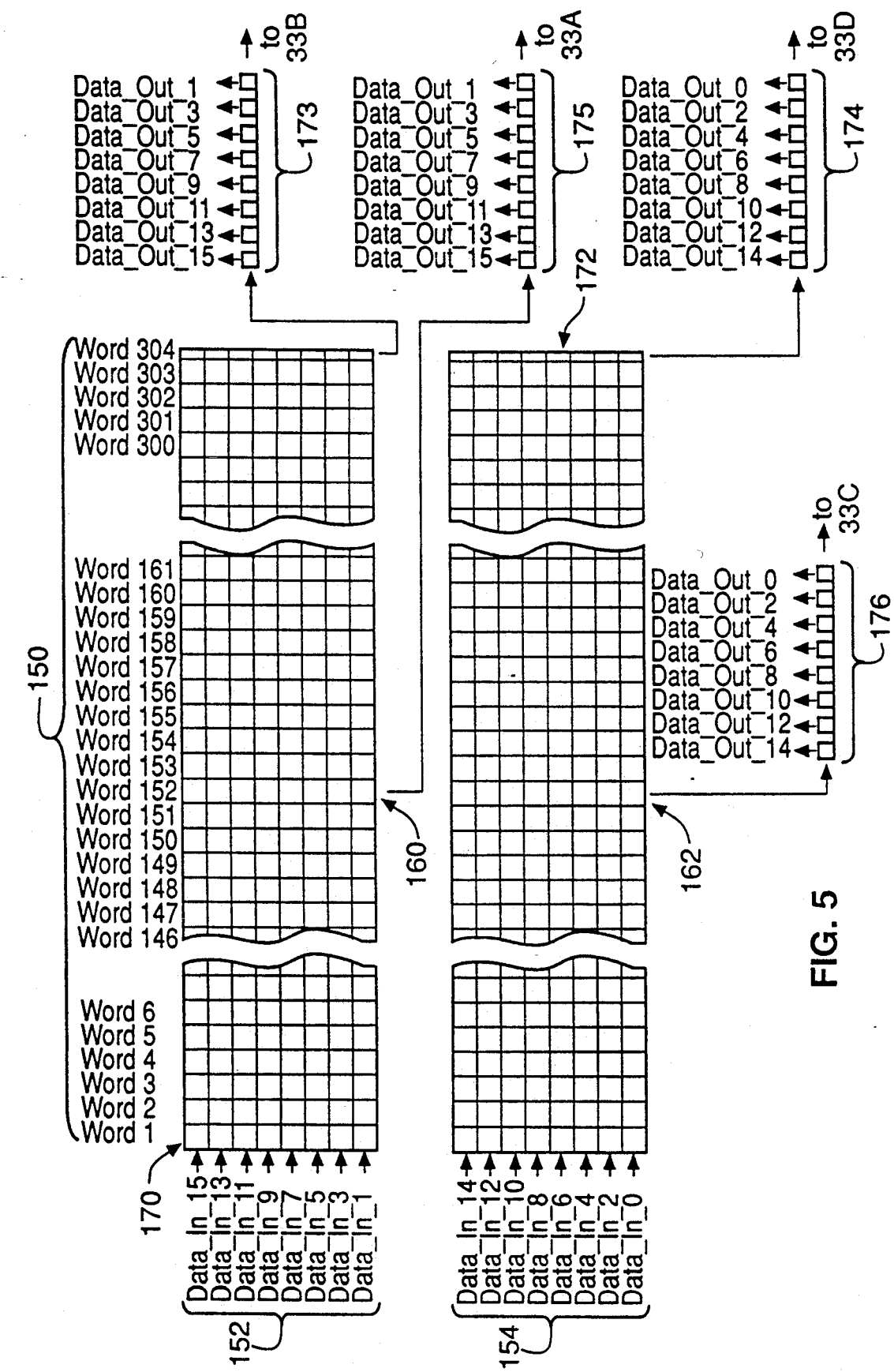
FIG. 5 is a flow diagram of the resequencing line store devices of the resequencing circuit of FIG. 4.

As illustrated in FIG. 5, each resequencing line store 127 and 128 comprises a sixteen-bit-wide, 304-word deep shift register 150. The sixteen-bit parallel data link is composed of sixteen channels of which the odd and even channels (labelled Data 1,3,5 . . . 15 and Data 0,2,4 . . . 14, respectively) are respectively attached to the odd and even memory cell row groups 152 and 154 of the shift register. Accordingly, the eight odd and eight even bits of each inputted sixteen-bit data word are shifted horizontally into the shift register 150 along the respective odd and even memory cell rows 152 and 154. Included in the shift register 150 are four eight-bit columnar subgroups of memory cells so as to comprise four vertical serial shift registers 160, 162, 170, and 172. Two of the vertical serial shift registers 160 and 162 are placed at the midpoint, or 152nd memory cell column, and the remaining vertical serial shift registers 170 and 172 comprise the endpoint, or 304th, memory cell column. Each of the vertical serial shift registers 160, 162, 170, and 172 thus operate on the 8-bit segments of the data present therein to serially shift data from the midpoint and end point columns respectively to the print head 20 over serial data channels 33A, 33B, 33C, and 33D. FIG. 5 shows eight-bit data words 173, 174, 175 and 176 being shifted from the odd and even endpoint and midpoint serial shift registers 170, 172, 160, and 162, respectively. Whereas the illustration for data words 173, 174, 175, and 176 indicates all are logic high level bits, this is merely for illustrative purposes only, as data of course may be strings of logic high and low signals. Each of the serially-shifted 8-bit data words contains the data residing in the respective odd or even row portions of the midpoint or endpoint columns. Hence, although all four 8-bit words are shifted out of the vertical shift registers simultaneously, as will be described hereinbelow, the particular composition of the eight data bits in each word is determined by the data shifted into the shift register 150 along the odd and even memory cell rows 152 and 154. Each of the resequencing line store devices 127 and 128 thereby resequences the 4864 bits of rasterized image data so as to exit the JIB 100 in an odd/low, odd/high, even/low, even/high order on the corresponding four data input channels 33A, 33B, 33C, and 33D. The resequenced data is then in suitable order for acceptance by the shift register assemblages on the print head 20.

Two clock lines are included in each of the illustrated control links from the writer interface 126 to each resequencing line store 127 and 128. The clock lines carry clock signals which control the movement of data to and from the resequencing line stores 127, 128. A load clock signal activates the loading of the sixteen bit data word present on the parallel input link into the first column (labelled WORD 1) of the shift register 150 and an unload clock signal causes the data present in the vertical serial shift registers 160, 170, 162, and 172 to be simultaneously unloaded onto the respective serial data channels 33A, 33B, 33C, 33D. The load clock signal also causes each data bit in each memory cell of any one column to be advanced in parallel fashion to a corresponding cell of the same row but in the next higher-numbered column. Hence, all 304 columns of the shift register 150 are filled with data before the vertical serial shift registers 160, 162, 170, 172 are activated. The resequencing line store 127 or 128 thereby is operable to resequence a full line of data (4864 bits).

Timing control functions for the load and unload clock, and other control of each resequencing line store 127 and 128, are provided by logic circuitry in the writer interface 126. As was previously described, in any two successive lines of data presented by the expander 120 to the resequencing circuit 125, the second line of data is resequenced by one of the two resequencing line store devices 127 and 128 while the first line of data, already resequenced, is sent to the print head 20 by the other resequencing line store. The writer interface 126 provides the load and unload clock signals to the corresponding resequencing line store in a timely fashion for such an alternating transfer of data lines.

With respect to the timing of the first and last lines of any one image frame of data, there is initially a set of commands provided by the microcontroller 136 to the writer interface 126 which loads registers in the writer interface 126 with location information on the starting and ending positions of each frame of the image data supplied by the expander 120. Because the JIB operates as a multi-page buffer store of sequential image frames, the frame location information is provided by the microcontroller 136 in conjunction with the operation of the memory controller 134. Such frame information is supplied by the microcontroller 134 to control the release of image frames, in a non-sequential order if such is desired, to the expander 120 and resequencing circuit 125 for printing by the print head 20. The resequencing of image data is therefore synchronized by the load and unload clock signals according to the rotation of the web 11. The writer interface 126 then may control the transfer and printing of the data on a frame-by-frame basis.

The expander 120, resequencing line store 127 and 128, and writer interface 126 may be constructed using transistor-transistor logic (TTL) or application-specific integrated circuit (ASIC) technology. The design of the resequencing line store ASIC and related writer interface logic circuitry may be realized by one of ordinary skill in the art after reading the specification herein.

Thus, a stream of data bits, representing in sequential order a data bit stream of 4864 pixels, is reformatted by relatively inexpensive circuitry and output to the print head in four serial data streams of eight data bit words.

As described hereinabove, the preferred embodiment operates upon 4864 bits of data or image signals for each line of rasterized image data. However, the resequencing line store according to the present invention may be configured to operate upon parallel data of greater or lesser line length, to be supplied to a print head design of correspondingly greater or lesser line length, by modifying the total number of rows and columns of memory cells therein. Thus, data generated by a data source 19 and provided as a bit stream of rasterized image data by a RIP 54 in sequential order may be read out in an odd/even, high/low order to the corresponding four data input channels of the shift register assemblages on the print head. To supply resequenced data to a (M×N) length print head, having input channels totalling an even integer C and requiring odd and even resequencing of data, each resequencing line store 127 and 128 would then comprise a M-bit-wide, N-word deep shift register, whereby data would be supplied over a M-bit parallel data link. The resequencing line store would incorporate (M/2)-bit vertical serial shift registers, two of each being operable respectively at the odd and even grouped memory cells of every (2IN/C)nd memory cell column, where I=1, 2, 3, ... C/2. Thus, there would be a total of C vertical serial shift registers incorporated in the M-bit-wide, N-word deep shift register. The basic resequencing line store concept described herein could be used to design resequencing circuits to reorganize serial data for a variety of multi-channel print heads with differing numbers, lengths and arrangements of shift register assemblages.

The invention has been described in detail with particular reference to preferred embodiments thereof, but it will be understood that variations and modifications can be effected within the spirit and scope of the invention.

What is claimed is:

1. A resequencing line store circuit for resequencing at least one line of data bits having a first sequential order, comprising:
   a resequencing line store device having a plurality of interconnected memory cells, said plurality of cells being arranged in a plurality of cell groups, said cell groups each having distributed therein a plurality of cell subgroups;
   means for shifting odd-numbered and even-numbered ones of said sequentially ordered data bits respectively into first and second ones of said cell groups; and
   means for serially shifting low and high ordered ones of said data bits respectively from low and high ordered ones of said plurality of cell subgroups, whereby said data bits are provided as resequenced data bits in separate subgroups of odd/low, odd/high, even/low, and even/high ordered bits, said resequenced data bits having a second sequential order being thereby different from said first sequential order.

2. The circuit of claim 1 wherein each of said cell groups is comprised of a respective set of rows of said memory cells and said plurality of cell subgroups is comprised of midpoint and endpoint columns of said memory cells.

3. The circuit of claim 2, wherein: said cell groups each form a parallel shift register, said data bits being shifted therein as multiple parallel bit words; and
   said midpoint and endpoint columns comprise a corresponding plurality of serial shift registers, said resequenced data bits being shifted therefrom serially.

4. The circuit of claim 1, further comprising a second resequencing line store device provided for respectively operating upon at least a second line of data, wherein said second line of data is resequenced while said first-mentioned line of data, already resequenced, is shifted from the first-mentioned of said resequencing line store devices, and said second resequenced line subsequently being shifted from said second resequencing line store device.

5. An apparatus for resequencing at least one line of data bits having a first sequential order to be furnished to a print head having a plurality of recording elements, said apparatus comprising:
   a matrix of M×N memory cell means for storage and selectable shifting of said data bits, said matrix forming M rows of shift registers of N column stages each, wherein M and N are both integers greater than one;
   means for supplying odd-numbered and even-numbered ones of said data bits respectively to first and second sets of said rows of shift registers;
   control means for providing first and second control signals;
   means responsive to said first control signal for parallel shifting of said data bits along the column stages to fill said matrix of memory cells with M×N bits of data; and
   means responsive to said second control signal for serially shifting high ordered ones of said data bits from the Nth column stage of said matrix and low ordered ones of said data bits from an intermediate column stage to said print head,
   whereby said data bits are provided to said print head as resequenced data bits in separate subgroups of odd/low, odd/high, even/low, and even/high ordered bits, said resequenced data bits having a second sequential order being thereby different from said first sequential order.

6. The apparatus of claim 5 further comprising:
   driver means for activating said recording elements operable for recording an image on a recording material; and
   shift register assemblage means having plural shift register assemblages, for storing said resequenced data serially inputted into each shift register assemblage and for outputting said stored data in parallel to said driver means.

7. The apparatus of claim 5, further comprising a second matrix of M×N memory cell means, said first-mentioned matrix and said second matrix respectively operable upon first and second lines of said data bits, wherein said second line of data bits is resequenced by said second matrix while said first line of data bits, already resequenced, is shifted to said print head from said first-mentioned matrix, and wherein said second resequenced line of data bits is subsequently shifted from said second matrix to said print head.

8. The apparatus of claim 5, further comprising:
   data compressor means operable for compressing image data to provide compressed data;
   image buffer means operable for storing said compressed data;
   expander means operable for retrieving said compressed data from said image buffer means and for reconstructing said compressed data into said line of data bits in a multibit parallel word format and transferring same to said memory cell means matrix; and
   controller means operable for controlling said data compression, buffer storage, and expansion.

9. Data resequencing apparatus for resequencing at least one line of data bits having a first sequential order, according to a distribution of the data bits into at least two groups of data bits, each group having at least two subgroups of data bits, comprising:
   at least one resequencing line store device having a plurality of interconnected memory cells for storage and selectable shifting of said data bits, each of said cells being adapted for storage of one of said bits, said plurality of cells being arranged in a plurality of cell groups and a plurality of cell subgroups corresponding respectively to said groups and subgroups of data bits;

means for shifting odd-numbered and even-numbered ones of said data bits respectively into first and second ones of said cell groups;

means for serially shifting high-ordered and low-ordered ones of said data bits respectively from first and second ones of said cell subgroups;

control means for providing control signals to implement said selectable shifting of said data bits into said cell groups and out of said plurality of cell subgroups;

control signal link means connected between said control means and said resequencing line store device for carrying said control signals; and data link means connected to said resequencing line store device for carrying said data bits;

whereby said data bits are shifted into said plurality of cell groups in said first sequential order and are serially shifted from said plurality of cell subgroups as resequenced data bits in separate subgroups of odd/low, odd/high, even/low, and even/high ordered bits, said resequenced data bits having a second sequential order being thereby different from said first sequential order.

10. The apparatus of claim 9 wherein said plurality of cell groups comprise a parallel shift register and said plurality of cell subgroups comprise a plurality of serial shift registers for serial readout of said resequenced data bits.

11. The apparatus of claim 10 further comprising:

recording means having plural recording elements and driver means for activating same operable for recording an image on a recording material on a data line by data line basis; and shift register assemblage means having plural shift register assemblages, for storing said resequenced data bits serially inputted into each shift register assemblage and for outputting said stored data bits in parallel to said driver means;

wherein said separate subgroups of resequenced data bits are provided in respective data streams to corresponding ones of said shift register assemblages.

12. The apparatus of claim 9, further comprising a second resequencing line store device operable upon a second line of data bits, and wherein said control signals alternately enable said first-mentioned and said second resequencing line store devices, said second line of data bits being resequenced by said second resequencing line store device while said first line of data bits, already resequenced, is shifted to said shift register assemblages from said first-mentioned resequencing line store device, and wherein said second resequenced line of data bits is subsequently shifted from said second resequencing line store device to said shift register assemblages.

13. The apparatus of claim 12, further comprising:

a rasterized image data source for providing a rasterized image data stream;

data compressor means operable for compressing said rasterized data stream to provide compressed image data;

image buffer means operable for storing said compressed image data;

expander means operable for retrieving said compressed image data from said image buffer means and for reconstructing said compressed image data into said line of data bits in a multibit parallel word format and transferring same to said data link; and controller means operable for controlling said data compression, buffer storage, and expansion.

14. An electrostatographic image recording apparatus comprising:

memory means for storing therein at least one line of image data bits having a first sequential order in groups of odd- and even-numbered data bit memory cells, each group having subgroups of high-order and low-order bit cells, each of said cells being adapted for storage and transfer of one of said bits, said plurality of cells being arranged in a plurality of cell groups and subgroups corresponding respectively to data bit groups and subgroups;

means for shifting odd-numbered and even-numbered ones of said data bits respectively into first and second ones of said cell groups;

means for serially shifting high ordered and low ordered ones of said data bits respectively from first and second ones of said cell subgroups to provide resequenced data bits in separate subgroups of odd/low, odd/high, even/low, and even/high ordered bits, said resequenced data bits having a second sequential order being thereby different from said first sequential order;

recording means having a plurality of recording elements and driver means for activating the recording elements on a line by line basis;

shift register assemblage means having a plural predetermined number of shift register assemblages, each for storing image signals formed from said resequenced data bits serially inputted into each shift register assemblage and for outputting said image signals in parallel to said driver means; and writer interface means operable for controlling a first transfer of said data line to said memory means and a second transfer of said data line in resequenced fashion to said shift register assemblage means.

15. The apparatus of claim 14, further comprising second memory means respectively operable upon at least a second line of data bits while said first line of data bits, already resequenced, is shifted to said shift register assemblages from said first-mentioned memory means, and wherein said second resequenced line of data bits is subsequently shifted from said second memory means to said shift register assemblages.

* * * * *